May 10, 1955
B. JAFFE
PIEZOELECTRIC TRANSDUCERS USING LEAD TITANATE AND LEAD ZIRCONATE
Filed March 24, 1954
2,708,244
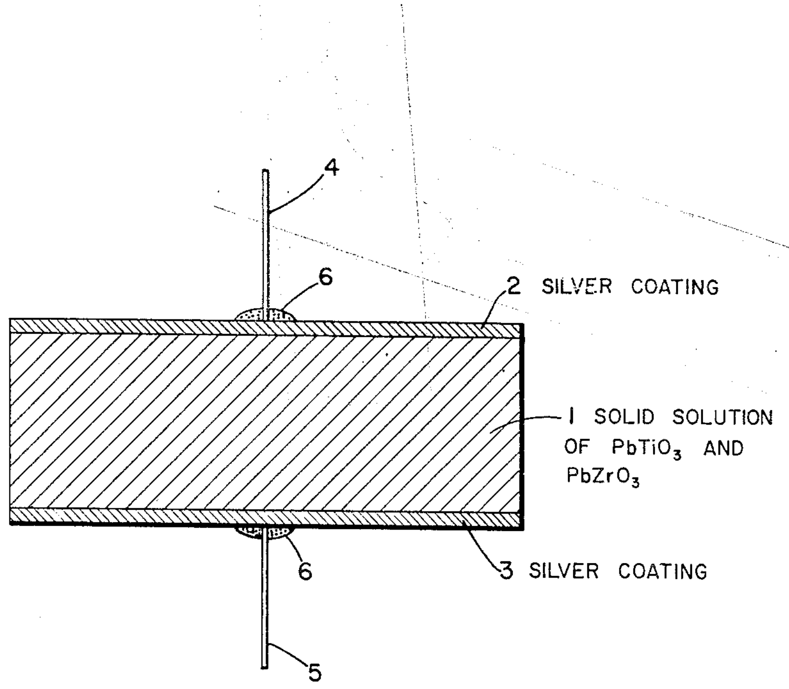
INVENTOR
BERNARD JAFFE
BY W. E. Thibodeau & A. W. Dew
ATTORNEYS United States Patent Office 2,708,244

Patented May 10, 1955

2,708,244

PIEZOELECTRIC TRANSDUCERS USING LEAD TITANATE AND LEAD ZIRCONATE

Bernard Jaffe, Hyattsville, Md., assignor to the United States of America as represented by the Secretary of the Army Application March 24, 1954, Serial No. 418,487

4 Claims. (Cl. 310—8)

(Granted under Title 35, U. S. Code (1952), sec. 266)

The invention described herein may be manufactured and used by or for the Government for governmental purposes without payment to me of any royalty thereon.

This invention relates to ceramic piezoelectric transducers. The invention provides transducers in which the active elements are solid solutions of lead titanate and lead zirconate.

The use of piezoelectric transducers for the measurement and reproduction of sound, noise, shock, and vibration, has increased greatly in recent years. Measurement of noise, shock, and vibration have come to play a particularly important part in the development of military and industrial equipment, as well as of civilian consumer goods. Both crystal and ceramic types of transducers have been widely used.

Crystal transducers are expensive, as they must be formed by lapidary techniques from perfect single crystals. Many of the commonly used ones—Rochelle salt, for instance—are water soluble, and others dehydrate easily.

The newer ceramic transducers, principally those using barium titanate, are more economical, more rugged, and capable of operation at somewhat higher temperatures, as compared with many popular crystal transducers. However, barium titanate transducers have a Curie point of only about 120° C. and lose their piezoelectric properties as they approach this temperature, so that such transducers are worthless for many applications. Furthermore, at −5° C. and −90° C. barium titanate undergoes polymorphic transformations, and at these temperatures the dielectric and piezoelectric constants go through maxima. These maxima make barium titanate transducers unsuitable for certain applications where flat or uniformly-varying output over a wide temperature range is desired.

I have now discovered that certain solid solutions of lead titanate and lead zirconate will provide ceramic piezoelectric transducers having a number of advantages over previous transducers. In particular, my transducers will operate at substantially higher temperatures than barium titanate transducers, and my transducers give a more uniform response over a wider temperature range.

A principal object of my invention is to provide a piezoelectric transducer that is rugged, low in cost, readily producible from readily available raw materials, insoluble in water, relatively uniform in characteristics over a wide temperature range, and capable of operation at elevated temperatures.

Other objects, aspects, uses, and advantages of the invention will become apparent from the following description and from the drawing.

The drawing shows a cross section of a piezoelectric transducer according to the invention.

Referring to the drawing, reference numeral 1 designates an electrically polarized ceramic body consisting of a solid solution of lead titanate ($PbTiO_3$) and lead zirconate ($PbZrO_3$). A preferred proportion of lead titanate in this solution is of the order of 45 mole percent.

Silver electrodes 2 and 3 are coated on two opposite faces of the ceramic body. Wire leads 4 and 5 are attached to silver electrodes 2 and 3 respectively by means of solder 6. When the ceramic is subjected to shock, vibration, or other mechanical stress, an electrical output is generated that can be taken from wire leads 4 and 5. Conversely, as with other piezoelectric transducers, application of electrical voltage to electrodes 2 and 3 will result in mechanical deformation of the ceramic body.

My transducers are fabricated by techniques similar to those used in the fabrication of other ceramic transducers. Lead oxide (PbO), zirconium dioxide ($ZrO_2$), and titanium dioxide ($TiO_2$) are mixed and pressed together in the form of discs or other suitable shapes and then heat-treated. The heat treatment converts these raw materials to lead titanate and lead zirconate. Good results have been obtained when this heat-treatment is performed in an enclosed space with an additional source of lead oxide vapor, as suggested by S. Roberts (Jour. Am. Ceram. Soc. 33 (2), 63 (1950)). It has been found satisfactory to raise the temperature of the specimens at a rate of 4.5° C. per minute until a temperature of 1220° C. is reached, to hold them at this temperature for 30 minutes, and then to allow them to cool naturally. The disc surfaces may then be coated with silver paste and fired to form adherent silver electrodes. Finally, the silvered discs are polarized at room temperature; D.-C.-field strengths of the order of 150 to 175 volts per mil applied for time durations of the order of 1 hour are satisfactory.

I have prepared and investigated transducer elements composed of solid solutions of lead titanate and lead zirconate in various proportions. I have found that those containing between 10 and 60 mole percent of lead titanate retain appreciable piezoelectric activity after removal of the polarizing field. The following table shows, for a number of compositions, the radial (disc) coupling coefficient that was measured at room temperature 3 days after polarization for 1 hour or more at 150 volts per mil:

*Table 1*

| Composition | | Radial coupling coef. (k) |
|---|---|---|
| $PbZrO_3$ | $PbTiO_3$ | |
| *Mole percent* | *Mole percent* | |
| 90 | 10 | 0.14 |
| 80 | 20 | .19 |
| 70 | 30 | .21 |
| 60 | 40 | .25 |
| 55 | 45 | .37 |
| 50 | 50 | .22 |
| 40 | 60 | .05 |

It will be noted from the table that the piezoelectric properties of these solid-solution ceramics become very strong in the vicinity of the rhombohedral-tetragonal phase boundary reported by G. Shirane and K. Suzuki (Jour. Phys. Soc. Japan 7 (3), 333 (1952)); the composition having 45 mole percent lead titanate marks the limit of the rhombohedral field. Individual specimens of this composition have shown values of radial coupling coefficient of as high as 0.40. Specimens of this composition show only a slight decrease of coupling coefficient when heated to 200° C.; above this temperature the decrease is more rapid. Tests indicate that transducers of this composition are probably suitable for intermittent service at temperatures up to 200° C. or possibly higher.

Limited experiments show that the piezoelectric response persists from Dry-Ice (solid $CO_2$) temperature (−80° C.) and probably lower, up to the Curie point (about 350° C.) for the limiting rhombohedral composition containing about 55 mole percent lead zirconate and 45 mole percent lead titanate. There do not seem to be any crystalline inversions in this temperature range that would cause irregularities in the properties with varying temperature. The radial coupling coefficient and resonance frequency change only very slightly between −80° C. and room temperature.

The following properties were found for the preferred composition at room temperature, before polarization:

*Table 2*

| | |
|---|---|
| Composition: | |
| $PbZrO_3$ | 55 mole percent. |
| $PbTiO_3$ | 45 mole percent. |
| Density of ceramic | $7.1\times10^3$ kilograms/cubic meter. |
| Theoretical crystal density | $7.98\times10^3$ kilograms/cubic meter. |
| Dielectric constant at 1 mc | 585. |
| Dissipation factor at 1 mc | 1.2 percent. |

After polarization of this preferred composition at 150 volts per mil for 1 hour, the following properties were found at room temperature:

*Table 3*

| | |
|---|---|
| Young's modulus | $7.5\times10^{10}$ newton/square meter. |
| Dielectric constant at 50 kc. (free) | 500. |
| Dielectric constant at 5 mc ("clamped by the high frequency). | 330. |
| Radial coupling coefficient | 0.37. |
| Transverse coupling coefficient | 0.22. |
| $d_{31}$ | $50\times10^{-10}$ coulombs/newton. |
| $g_{31}$ | 0.011 volt-meters/newton. |
| $d_{33}$ | $130\times10^{-10}$ coulombs/newton. |
| $g_{33}$ | 0.029 volt-meters/newton. |
| Longitudinal coupling coefficient (estimated). | 0.5 to 0.6. |

It has been found that the tetragonal compositions nearest the phase boundary, which contain slightly more than 0.45 mole percent $PbTiO_3$, have equally high values of the radial coupling coefficient at room temperature. These tetragonal compositions, however, show a more severe decrease when the temperature of the specimen is raised. The addition of still more $PbTiO_3$ or $PbZrO_3$, removing the composition further from the rhombohedral-tetragonal phase boundary in one direction or the other, causes a lowering of the piezoelectric activity.

It may be pointed out that the two major advantages of my transducers over barium titanate transducers—higher-temperature operation, and more uniform characteristics over a wider temperature range—are attained without sacrifice of other important features. My transducers are rugged and durable, insoluble in water, high in piezoelectric activity, low in cost, and readily producible from raw materials that are readily available in large quantities.

In addition to use for sensing sound and vibration, my transducers can be used in various other applications requiring materials having piezoelectric properties. In particular, these transducers offer practical possibilities as piezoelectric filters. If desired, their piezoelectric properties would permit their use for frequency control in oscillator circuits, although their frequency stability would not be as high as that of conventional quartz crystals. When I speak of piezoelectric transducers I intend to include piezoelectric filters, piezoelectric frequency control devices, and other devices dependent for their operation on the piezoelectric properties of a material.

It will be apparent that the embodiments shown are only exemplary and that various modifications can be made in construction and arrangement within the scope of the invention as defined in the appended claims.

I claim as my invention:

1. A piezoelectric transducer comprising, in combination: a pair of electrodes; and, interposed between said electrodes, a ceramic element consisting of a solid solution of lead titanate and lead zirconate, the proportion of lead titanate in said solution being within the range 10 to 95 mole percent and the remainder being lead zirconate.

2. A piezoelectric transducer comprising, in combination: a pair of electrodes; and, interposed between said electrodes, a ceramic element consisting of an electrically polarized solid solution of lead titanate and lead zirconate, the proportion of lead titanate in said solid solution being within the range 10 to 60 mole percent and the remainder being lead zirconate.

3. A piezoelectric transducer comprising, in combination: a pair of electrodes; and, interposed between said electrodes, a ceramic element consisting of an electrically polarized solid solution of lead titanate and lead zirconate, the proportion of lead titanate in said solution being substantially the maximum that will yield a ceramic composed of rhombohedral crystals at room temperature, said proportion being nominally 45 mole percent.

4. A piezoelectric transducer comprising, in combination: a pair of electrodes; and, interposed between said electrodes, a ceramic element consisting of an electrically polarized solid solution of lead titanate and lead zirconate, the proportion of lead titanate in said solid solution being between 42 and 47 mole percent and the remainder being lead zirconate.

References Cited in the file of this patent

UNITED STATES PATENTS

| | | |
|---|---|---|
| 2,402,517 | Wainer | June 18, 1946 |
| 2,541,833 | Roberts | Feb. 13, 1951 |